(12) United States Patent
Gong

(10) Patent No.: US 8,300,567 B2  
(45) Date of Patent: Oct. 30, 2012

(54) METHOD AND APPARATUS FOR DOWNLINK MULTIPLE-USER MULTIPLE OUTPUT SCHEDULING

(75) Inventor: Michelle Xiaohong Gong, Sunnyvale, CA (US)

(73) Assignee: Intel Corporation, Santa Clara, CA (US)

( * ) Notice: Subject to any disclaimer, the term of this patent is extended or adjusted under 35 U.S.C. 154(b) by 363 days.

(21) Appl. No.: 12/653,794

(22) Filed: Dec. 21, 2009

(65) Prior Publication Data

US 2011/0149880 A1  Jun. 23, 2011

(51) Int. Cl.
- *H04H 20/71* (2008.01)
- *H04K 1/10* (2006.01)
- *H04W 72/00* (2009.01)

(52) U.S. Cl. .......... 370/312; 455/450; 375/260
(58) Field of Classification Search .......... 370/329–330, 370/335–338, 342–348, 438–444; 455/450, 455/452.1–452.2, 509–515, 517; 375/260–264
See application file for complete search history.

(56) References Cited

U.S. PATENT DOCUMENTS

| | | | |
|---|---|---|---|
| 7,330,433 B2* | 2/2008 | Shao et al. | 370/235 |
| 7,864,804 B2* | 1/2011 | Kim et al. | 370/469 |
| 2004/0170186 A1* | 9/2004 | Shao et al. | 370/412 |
| 2005/0111462 A1* | 5/2005 | Walton et al. | 370/395.4 |
| 2007/0183380 A1 | 8/2007 | van Rensburg et al. | |
| 2009/0003282 A1* | 1/2009 | Meylan et al. | 370/331 |
| 2009/0116384 A1* | 5/2009 | Kim et al. | 370/230 |
| 2009/0154352 A1* | 6/2009 | Sun | 370/235 |
| 2010/0220679 A1* | 9/2010 | Abraham et al. | 370/329 |
| 2011/0103395 A1* | 5/2011 | Ratnakar et al. | 370/412 |
| 2011/0128921 A1* | 6/2011 | Ray et al. | 370/329 |
| 2011/0130099 A1* | 6/2011 | Madan et al. | 455/63.1 |

FOREIGN PATENT DOCUMENTS

| | | |
|---|---|---|
| KR | 10-2008-0039768 A | 5/2008 |
| KR | 10-2009-0074823 A | 7/2009 |
| KR | 10-2009-0093388 A | 9/2009 |
| WO | 2011/084228 A2 | 7/2011 |
| WO | 2011/084228 A3 | 10/2011 |

OTHER PUBLICATIONS

International Search Report and Written Opinion received for International Patent Application No. PCT/US2010/055661, mailed on Jun. 30, 2011, 8 pages.

* cited by examiner

*Primary Examiner* — Thai Hoang
(74) *Attorney, Agent, or Firm* — Forefront IP Lawgroup, PLLC

(57) ABSTRACT

Embodiment and methods and means for scheduling an access point (AP) traffic destined for multiple stations (STAs) in a downlink multiple-user multiple-input-multiple-output (MIMO) network transmission are provided.

12 Claims, 3 Drawing Sheets

METHOD AND APPARATUS FOR DOWNLINK MULTIPLE-USER MULTIPLE OUTPUT SCHEDULING

BACKGROUND

A multiple-input-multiple-output (MIMO) wireless network is a communication system that generally includes an access point (AP) having multiple antennas communicatively coupled to multiple receiving stations. To support downlink multi-user MIMO network, the access point (AP) may need to schedule multiple packets destined for the multiple stations for simultaneous transmission. Existing IEEE 802.11-207 standards do not support downlink multi-user MIMO. As such, current access points choose the first packet or the first aggregated packet in the access point queue for transmission.

Because an access point has a pre-defined limited number of antennas, it transmits simultaneously to a pre-defined limited number of stations. The pre-defined number is denoted as N. Because the access point cannot simply empty out its queue by transmitting to all stations, a simple scheduling scheme is for the access point (AP) to choose the first N stations' packets to transmit.

The Federal Communication Commission currently limits effective isotropic radiated power (EIRP), when the transmit power is shared among multiple devices, the received power at each individual device is decreased. As an example, if there are two simultaneous transmissions in one downlink multi-user MIMO, the corresponding signal-to-noise ratio (SNR) is reduced by 3 dB. If there are six simultaneous transmissions, the received SNR is reduced by approximately 8 dB. Because the data rate has to be reduced for each of the simultaneous transmissions, the performance gain diminishes if there is a big duration difference among transmissions destined for different stations. As an example, if a transmission toward one station takes significantly longer than those of other stations and the longest transmission has be to sent at a lower data rate, it will have a negative impact on the performance gain of using multiple antennas versus a single antenna system.

BRIEF DESCRIPTION OF THE DRAWINGS

The detailed description is set forth with reference to the accompanying figures. In the figures, the left-most digit(s) of a reference number identifies the figure in which the reference number first appears. The use of the same reference numbers in different figures indicates similar or identical items.

In accordance with common practice, the various described features are not drawn to scale but are drawn to emphasize specific features relevant to the present specification. Reference characters denote like elements throughout Figures and text.

DETAILED DESCRIPTION

In the following detailed description, reference is made to the accompanying drawings, which form a part hereof, and in which is shown by way of illustration specific embodiments in which the invention may be practiced. These embodiments are described in sufficient detail to enable those skilled in the art to practice the invention, and it is to be understood that other embodiments may be utilized and that logical, mechanical and electrical changes may be made without departing from the spirit and scope of the present invention. The following detailed description is, therefore, not to be taken in a limiting sense, and the scope of the present invention is defined only by the claims and equivalents thereof.

In the following discussion, an exemplary environment is first described that is operable to employ a scheduling mechanism to improve the performance of a downlink multi-user multiple-input-multiple-output (MIMO) network. Exemplary devices and procedures are then described that may be employed in the exemplary environment, as well as in other environments.

Exemplary Embodiment

Figure 1:
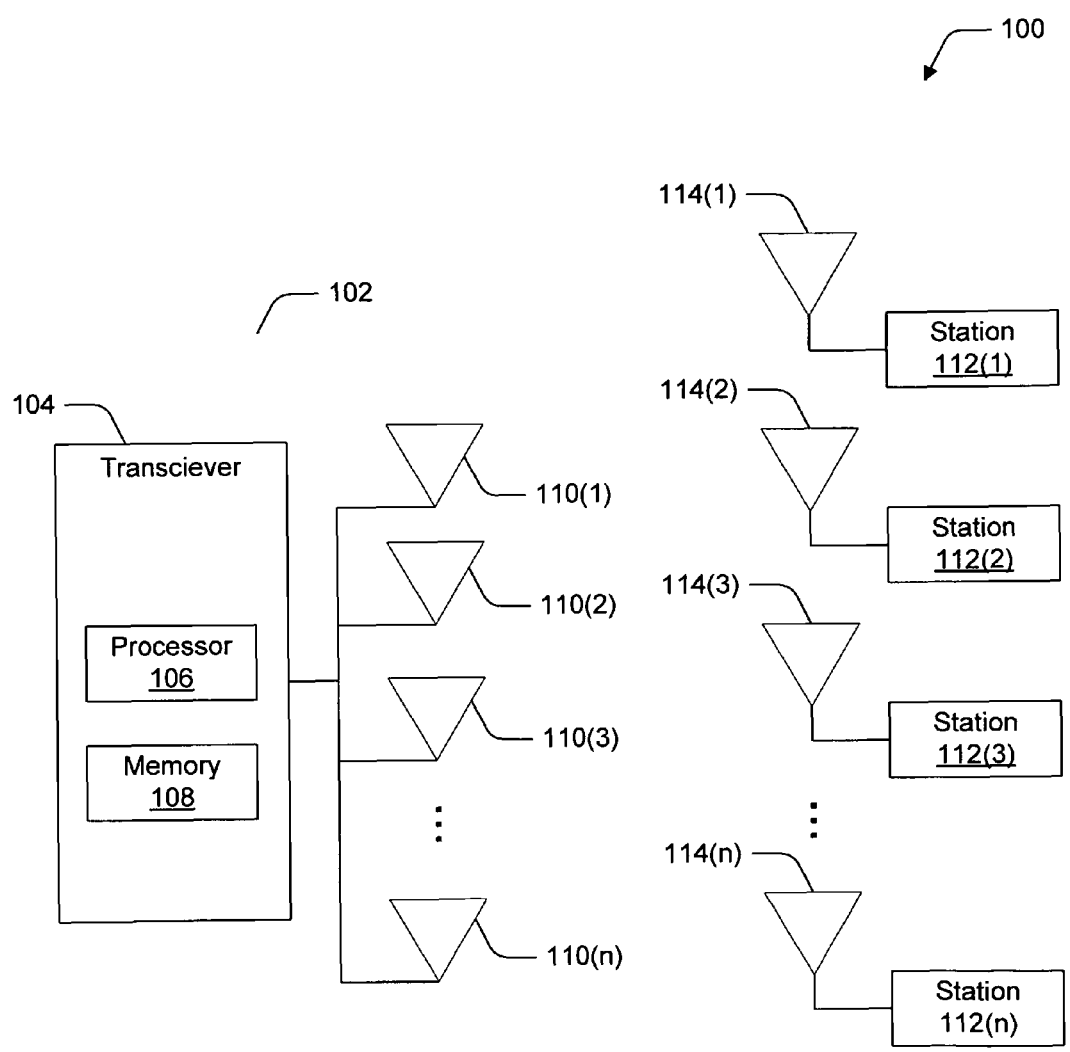
FIG. 1 is a block diagram of an embodiment of a wireless multi-user multiple-input-multiple-output network comprising an access point having multiple antennas and a plurality of stations.

FIG. 1 illustrates an exemplary implementation of an environment 100 that is operable to employ a scheduling mechanism to improve the performance of a downlink multi-user multiple-input-multiple-output (MIMO) network. The environment 100 is depicted as having an access point (AP) 102 which comprises a transceiver 104. The transceiver 104 includes in part a processor 106 and a memory 108. The access point 102 further includes a plurality of antennas 110(1)-110(*n*) (where the integer n represents any number of antennas). As depicted, the access point 102 includes four antennas 110(1), 110(2), 110(3) and 110(*n*). In other embodiments, different numbers of antennas may be used.

The processor core 106 represents a processing unit of any type of architecture which has the primary logic, operation devices, controllers, memory systems, and so forth of the access point 102. For instance the processor core 106 may incorporate one or more processing devices and a chipset having functionality for memory control, input/output control, graphics processing, and so forth.

The processor core 106 may further be coupled via a memory bus (not shown) to a memory 108 which in an embodiment represents "main" memory of the access point (AP) 102 and which may be utilized to store and/or execute system code and data. Memory 108 may be implemented with dynamic random access memory (DRAM), static random access memory (SRAM), or any other type of memories including those that do not need to be refreshed.

Memory 108 may also include other storage devices. These other memory devices include removable media drives (for example, CD/DVD drives), card readers, flash memory and so forth. The memory 108 may be connected to the processor core 106 in a variety of ways such as via Integrated Drive Electronics (IDE), Advanced Technology Attachment (ATA), Serial ATA (SATA), Universal Serial Bus (USB), and so forth. The memory 108 stores a variety of application modules (not shown) which may be executed via the processing core 106 and memory 108 to provide a variety of functionality to the access point 102.

FIG. 1 further illustrates the environment 100 as including a plurality of stations (STA) 112. As depicted, the environment 100 includes four independent stations 112(1), 112(2), 112(3) and 112(*n*). Each station 112 includes an antenna 114. In an alternative embodiment, each station 112 may have a plurality of antennas 114. It is further contemplated that the environment 100 may include a single station (STA) 112 that includes a plurality of antennas 114 that matches the number of antennas 110 included with the access point.

Each antenna 110 of the access point 102 may transmit a unique signal to a specific station 112 antenna 114 or the access point can multiplex data packets intended for a specific station 112. Multiplexing refers to the process by which a signal is split up into a plurality of signals and combined into one signal. Once a data packet is multiplexed into a plurality of signals, the access point 102 can transmit the plurality of signals.

To efficiently schedule downlink multiple-user MIMO transmissions, access point (AP) 102 should avoid scheduling transmissions that have very different medium duration time. An objective is to schedule the first N transmissions that take the longest time to transmit subject to two constraints: 1) the difference between a maximum duration and a minimum duration of valid data transmissions should be less that a predefined percentage and 2) all queuing delays per access category (AC) for the remaining stations should be less than a pre-defined delay value per access category.

The IEEE 802.11e Enhanced Distributed Channel Access (EDCA) is a quality-of-service (QoS) extension of the IEEE 802.11 Distributed Coordination Function (DCF). The major enhancement to support QoS is that the EDCA differentiates packets using different priorities and maps them to specific access categories (AC) that are buffered in separate queues at an access point or station. Each access category within an access point/station having its own EDCA parameters contends for the channel independently of the others. Each access category within the access point is assigned a priority based upon its parameters.

When a particular access category (AC) wins the internal EDCA contention, the access point (AP) chooses N stations (STAs) that have buffered traffic with queuing delays exceeding a predefined minimum Delay value for that access category (AC):

$$j = \arg\max_{k \in \theta} \text{delay}[k][AC] \quad (1)$$

subject to:

$$\text{Delay\_max}[AC] \geq \text{delay}[k]\{AC\} \geq \text{Delay\_min}[AC] \quad (2)$$

Where j denotes a user, delay[k][AC] denotes the delay of the first packet in the $k^{th}$ user's $AC^h$ queue, Delay_max[AC] represents the maximum delay bound for that access category, and Delay_min[AC] represents the minimum delay bound for that access category (AC). If delay[k][AC] exceeds Delay_max[AC], the access point (AP) will drop buffered packets that have exceeded the max delay bound.

If fewer than N stations (STAs) have been chosen for transmission, the access point chooses an unchosen station (STA), for which the buffered traffic for that access category (AC) has the maximum medium duration among those of the other stations (STAs):

$$j = \arg\max_{k \in \theta} \frac{\text{aggregate\_pkt\_len}(k)}{\text{data\_rate}(k)} \quad (3)$$

Subject to the following equation (4):

$$\arg\max_{k \in \Omega} \frac{\text{aggregate\_pkt\_len}(k)}{\text{data\_rate}(k)} - \arg\max_{m \in \Omega} \frac{\text{aggregate\_pkt\_len}(m)}{\text{data\_rate}(m)} \leq \quad (4)$$

Diff_duration

Where θ denotes the set of stations (STAs) that have not been chosen for the downlink multiple-user MIMO transmission, Q denotes the set of stations (STAs) that have been chosen for the downlink multiple-user MIMO transmission, aggregate_pkt_len(k) represents the length of the aggregated packet of the $k^{th}$ user, and data_rate(k) represents the data rate of the $k^{th}$ user in a downlink multiple-user MIMO transmission. Diff_duration is a predefined percentage.

The access point (AP) (e.g., access point 102) aggregates packets in a user's access category (AC) queue up to the aggregated Media Access Control (MAC) Protocol Data Unit (A-MPDU) aggregation limit, i.e. 64 MPDUs. The access point (AP) may aggregate and transmit only a portion of the buffered traffic for a particular user if the user's buffered traffic as a whole exceeds the criterion defined by equation (4) and there are fewer than N chosen stations (STAs) for the downlink multiple-user MIMO transmission.

Figure 2:
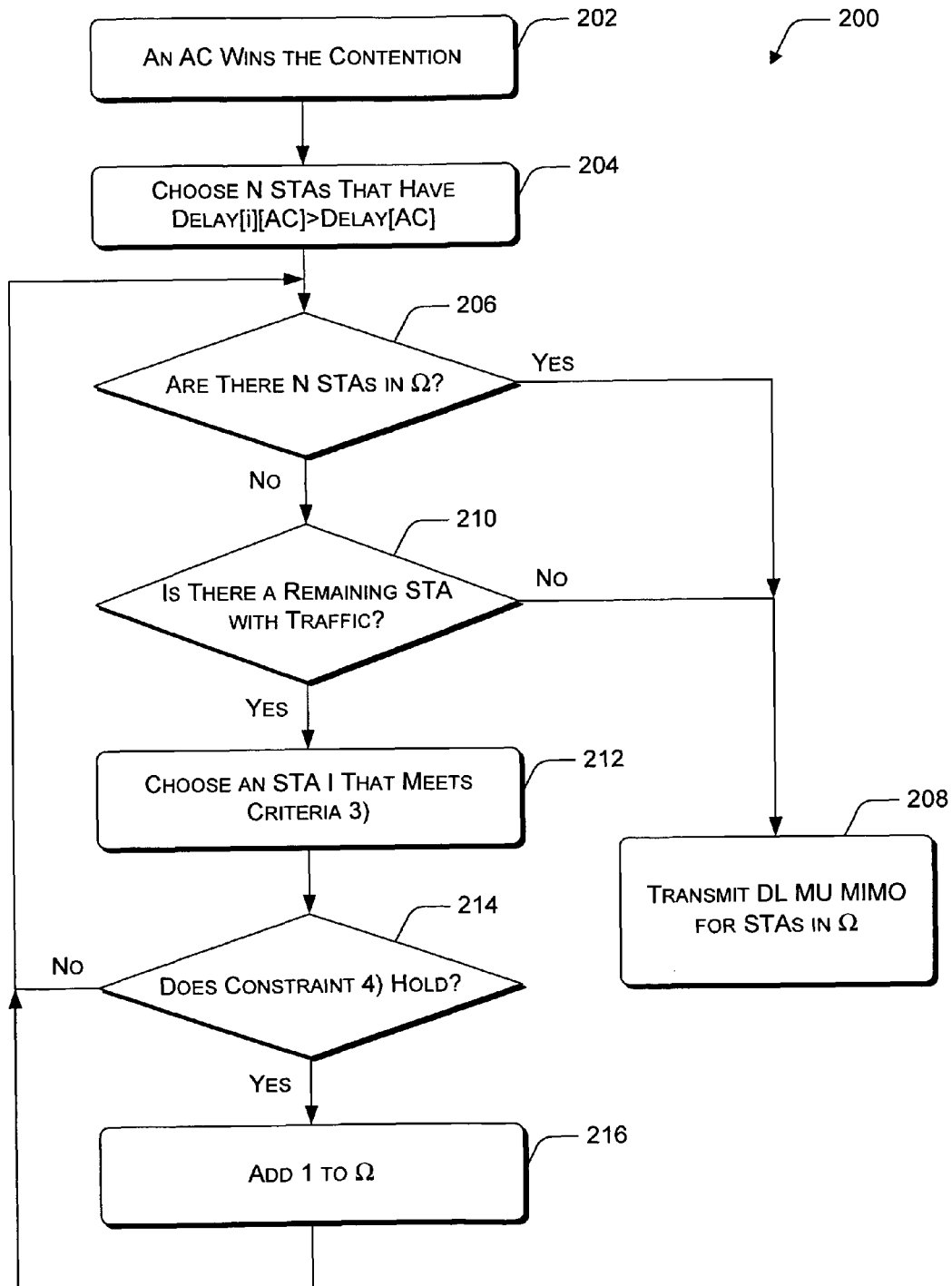
FIG. 2 is a flow chart of an embodiment of a method for scheduling packet delivery in a wireless multi-user multiple-input-multiple-output (MIMO) network.

FIG. 2 shows an illustrative process of scheduling packet delivery across a multiple-user MIMO network that may, but need not, be implemented using the architecture shown in FIG. 1. The process for scheduling packet delivery across a multiple-user MIMO network is illustrated as a collection of blocks in a logical flow graph, which represent a sequence of operations that can be implemented in hardware, software, or a combination thereof. In the context of software, the blocks represent computer-executable instructions that, when executed by one or more processors, perform the recited operations. Generally, computer-executable instructions include routines, programs, objects, components, data structures, and the like that perform particular functions or implement particular abstract data types. The order in which the operations are described is not intended to be construed as a limitation, and any number of the described blocks can be combined in any order and/or in parallel to implement the process. For discussion purposes, the process will be described in the context of the architecture of FIG. 1.

FIG. 2 depicts a flowchart 200 that describes a method for scheduling packet delivery across a multiple-user MIMO network in accordance with one embodiment. In describing the method of flowchart 200, reference is made to the access point 102 of FIG. 1. It is to be understood, however, that the method of flowchart 200 is contemplated to be broadly applicable to a vast range of devices, and is not to be limited in its use only in connection with the exemplary embodiment of FIG. 1.

At step 202, an access category (AC) wins the contention. An access category wins when the access point (AP) determines that the parameters associated with the access category have the highest priority. Each access category (AC) within a station comprises its own Enhanced Distribution Channel Access (EDCA) parameters.

At step 204, the access point chooses N stations (STAs) that have delay[i][AC] greater than the Delay[AC]. The number N stations is determined based upon the number of antennas the access point has enabled and the delay[i][AC] represents the current wait time in the AC queue for a specific AC. The Delay[AC] is a standardized minimal time delay associated with the type/class of access category (AC). The Access point (AP) reviews the AC queue to ascertain which AC queues current pending time exceeds the minimal standardized time associated with the particular type/class of access category (AC).

At step 206, the access point (AP) determines if there are N stations in the set of stations (STAs) that have been chosen for the downlink multiple-user MIMO transmission. If the access point (AP) determines that there are N stations, then the access point (AP) transmits the downlink multiple-user MIMO transmission for the stations within the set of stations at step 208.

If the access point determines that there are not N number of stations in the set of stations, then the Access point determines whether or not there remains any stations with traffic at step 210. If the access point (AP) determines that no station is waiting upon traffic, the access point (AP) transmits the downlink multiple-user MIMO transmission for the stations within the set of stations at step 208.

At step 212, if the access point (AP) does determine that there remaining stations with traffic, the access point (AP) then chooses a station for which the buffered traffic for the associated access category has the maximum medium duration of the remaining unchosen stations.

At step 214, the access point then determines whether the selected station's medium duration minus the minimum duration associated with the access category is less than or equal to a predetermined percentage. If it is, then the chosen station (STA) is added to the set of stations (STAs) at step 216. Steps 206-216 are then repeated. If, at step 214, the access point (AP) determines that the selected station's medium duration minus the minimum duration associated with the access category is not less than or equal to a predetermined percentage, the access point (AP) begins again at step 206.

Figure 3:
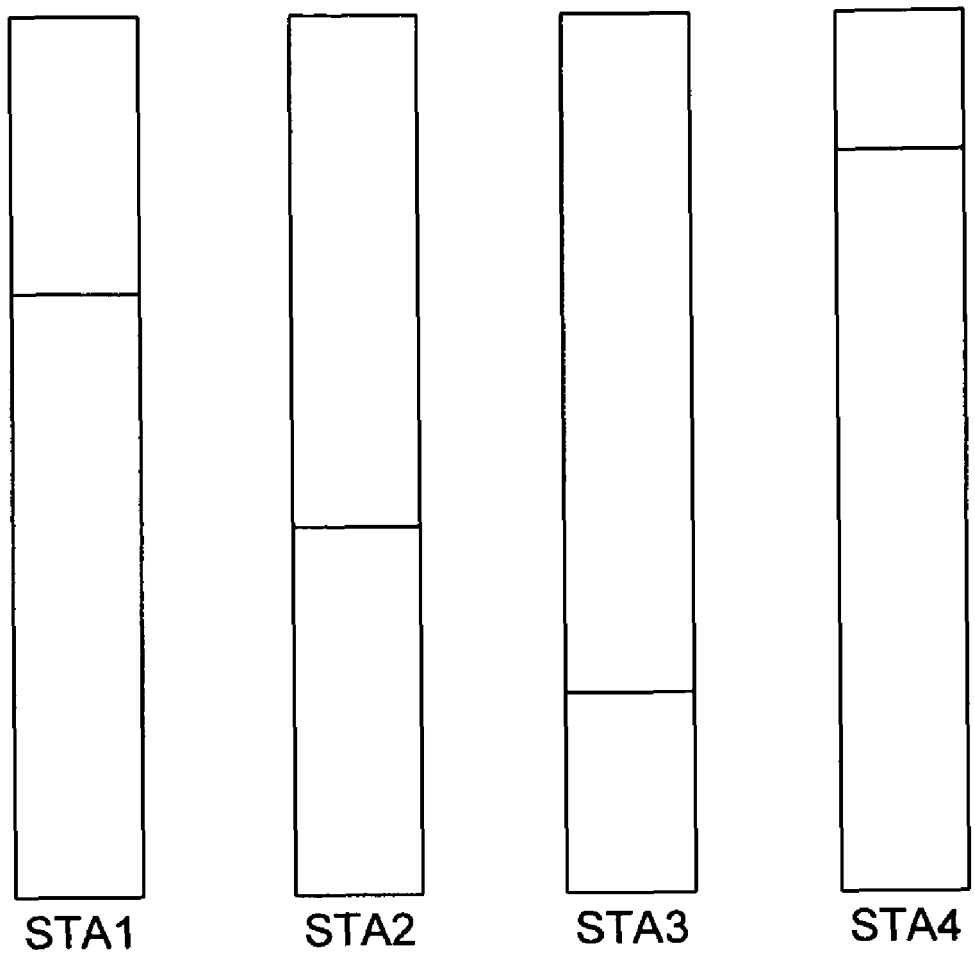
FIG. 3 is a block diagram of exemplary queues for a plurality of stations within a wireless multi-user multiple-input-multiple-output (MIMO) network.

FIG. 3 illustrates an example system 300 of an access point with multiple AC queues for different stations. The access point of the present example can support 3 simultaneous transmissions in one downlink multiple-user MIMO transmission. The medium duration is illustrated as queue length in FIG. 3.

Among the four stations (STA1 through STA4) represented in FIG. 3, STA2 experiences delay that exceeds a Delay[AC]. The access point AP will initially schedule STA2. Then, the access point (AP) chooses STA4 and STA1 as each have the longest medium duration but still meet the criterion that it's medium duration minus the minimum duration associated with the access category is less than or equal to a predetermined percentage (as illustrated above in equation 4). As a result of the scheduling algorithm, the AP chooses STA1, STA2, and STA4 for the current downlink multiple-user MIMO transmission.

Although specific details of illustrative methods are described with regard to the figures and other flow diagrams presented herein, it should be understood that certain acts shown in the figures need not be performed in the order described, and may be modified, and/or may be omitted entirely, depending on the circumstances. As described in this application, modules and engines may be implemented using software, hardware, firmware, or a combination of these. Moreover, the acts and methods described may be implemented by a computer, processor or other computing device based on instructions stored on memory, the memory comprising one or more computer-readable storage media (CRSM).

The CRSM may be any available physical media accessible by a computing device to implement the instructions stored thereon. CRSM may include, but is not limited to, random access memory (RAM), read-only memory (ROM), electrically erasable programmable read-only memory (EEPROM), flash memory or other solid-state memory technology, compact disk read-only memory (CD-ROM), digital versatile disks (DVD) or other optical disk storage, magnetic cassettes, magnetic tape, magnetic disk storage or other magnetic storage devices, or any other medium which can be used to store the desired information and which can be accessed by a computing device.

What is claimed is:

1. A system for scheduling packet delivery across a multiple-user multiple-input-multiple-output (MIMO) network, wherein the system comprises:

an access point (AP) in the MIMO network that schedules traffic destined for multiple stations (STAs) in a downlink multiple-user MIMO transmission, wherein scheduling traffic comprises ascertaining when a particular access category (AC) wins an internal Enhanced Distributed Channel Access (EDCA) contention and the access point chooses N stations that have buffered traffic with queuing delays exceeding a predefined minimum Delay value for the particular AC.

2. The system of claim 1, wherein N is equal to the number of antennas associated with the access point (AP).

3. The system of claim 1, wherein the access point (AP) choose N stations in accordance with:

$$j = \underset{k \in \theta}{\mathrm{argmax}}\, delay[k][AC]$$

subject to:

$$Delay_{max[AC]} \geq delay[k][AC] \geq Delay_{min[AC]}$$

wherein j denotes a user, delay[k][AC] denotes a delay of a first packet in a $k^{th}$ user's $AC^{th}$ queue, Delay_max[AC] comprises a maximum delay bound for the particular access category (AC), and Delay_min[AC] comprises a minimum delay bound for the particular access category (AC).

4. The system of claim 3, wherein if delay[k][AC] exceeds Delay_max[AC], the access point (AP) drops buffered packets that have exceeded the max delay bound.

5. The system of claim 1, wherein if fewer than N stations (STA) are chosen for transmission, the AP chooses a particular unchosen station (STA) for which buffered traffic for an access category (AC) associated with the particular unchosen station has the maximum medium duration among a plurality of unchosen stations (STA).

6. The system of claim 5, wherein ascertaining the maximum medium duration comprises employing the following:

$$j = \underset{k \in \theta}{\mathrm{argmax}}\, \frac{aggregate_{pkt_{len(k)}}}{data_{rate(k)}}$$

subject to:

$$\underset{k \in \Omega}{\mathrm{argmax}}\, \frac{aggregate_{pkt_{len(k)}}}{data_{rate(k)}} - \underset{m \in \Omega}{\mathrm{argmax}}\, \frac{aggregate_{pkt_{len(m)}}}{data_{rate(m)}} \leq Diff_{duration}$$

wherein θ denotes a set of stations (STAs) that have not been chosen for the downlink multiple-user MIMO transmission, Ω denotes a set of stations (STAs) that have been chosen for the downlink multiple-user MIMO transmission, aggregate_pkt_len(k) represents the length of the aggregated packet of a $k^{th}$ user, data_rate(k) represents a data rate of the $k^{th}$ user in a downlink multiple-user MIMO transmission, and Diff_duration is a predefined percentage.

7. A computer-implemented method for scheduling packet delivery across a multiple-user multiple-input-multiple-output (MIMO) network comprising:

scheduling by an access point (AP) in the MIMO network traffic destined for multiple stations (STAs) in a downlink multiple-user MIMO transmission, wherein scheduling traffic comprises ascertaining when a particular access category (AC) wins an internal Enhanced Distributed Channel Access (EDCA) contention and the access point (AP) choosing N stations that have buffered traffic with queuing delays exceeding a predefined minimum Delay value for the particular AC.

8. The computer-implemented method of claim 7, wherein N is equal to the number of antennas associated with the access point (AP).

9. The computer-implemented method of claim 7, wherein the access point (AP) choose N stations in accordance with:

$$j = \underset{k \in \theta}{\mathrm{argmax}}\, delay[k][AC]$$

subject to:

$$Delay_{max[AC]} \geq delay[k]\{AC\} \geq Delay_{min[AC]}$$

wherein j denotes a user, delay[k][AC] denotes a delay of a first packet in a $k^{th}$ user's $AC^{th}$ queue, Delay_max[AC] comprises a maximum delay bound for the particular access category (AC), and Delay_min[AC] comprises a minimum delay bound for that access category (AC).

10. The computer-implemented method of claim 7, wherein if delay[k][AC] exceeds Delay_max[AC], the access point (AP) drops buffered packets that have exceeded the max delay bound.

11. The computer-implemented method of claim 7, wherein if fewer than N stations (STA) are chosen for transmission, the AP chooses a particular unchosen station (STA) for which buffered traffic for an access category (AC) associated with the particular unchosen station has the maximum medium duration among a plurality of unchosen stations (STA).

12. The computer-implemented method of claim 11, wherein ascertaining the maximum medium duration comprises employing the following:

$$j = \underset{k \in \theta}{\mathrm{argmax}}\, \frac{aggregate_{pkt_{len(k)}}}{data_{rate(k)}}$$

subject to:

$$\underset{k \in \Omega}{\mathrm{argmax}}\, \frac{aggregate_{pkt_{len(k)}}}{data_{rate(k)}} - \underset{m \in \Omega}{\mathrm{argmax}}\, \frac{aggregate_{pkt_{len(m)}}}{data_{rate(m)}} \leq Diff_{duration}$$

wherein $\theta$ denotes a set of stations (STAs) that have not been chosen for the downlink multiple-user MIMO transmission, $\Omega$ denotes a set of stations (STAs) that have been chosen for the downlink multiple-user MIMO transmission, aggregate_pkt_len(k) represents the length of the aggregated packet of a $k^{th}$ user, data_rate(k) represents a data rate of the $k^{th}$ user in a downlink multiple-user MIMO transmission, and Diff_duration is a predefined percentage.

* * * * *